(12) United States Patent
Marroyo Palomo et al.

(10) Patent No.: US 8,930,035 B2
(45) Date of Patent: Jan. 6, 2015

(54) PROCEDURE FOR SUPPLY CONTROL AND STORAGE OF POWER PROVIDED BY A RENEWABLE ENERGY GENERATION PLANT

(75) Inventors: Luis Marroyo Palomo, Pamplona (ES); Javier Marcos Álvarez, Pamplona (ES); María Asunción Padros Razquin, Sarriguren (ES); Daniel Rabal Echeverria, Sarriguren (ES); David Cuesta Lerín, Sarriguren (ES); Iñigo Berazaluce Minondo, Sarriguren (ES); Christopher Walti, Chicago, IL (US)

(73) Assignee: Acciona Energia, S.A., Sarriguren, Navarra (ES)

( * ) Notice: Subject to any disclaimer, the term of this patent is extended or adjusted under 35 U.S.C. 154(b) by 639 days.

(21) Appl. No.: 13/171,789

(22) Filed: Jun. 29, 2011

(65) Prior Publication Data
US 2013/0006431 A1    Jan. 3, 2013

(51) Int. Cl.
| | |
|---|---|
| G05D 3/12 | (2006.01) |
| G06Q 50/06 | (2012.01) |
| G06Q 10/06 | (2012.01) |
| H02J 3/32 | (2006.01) |
| H02J 3/38 | (2006.01) |
| H02J 3/16 | (2006.01) |
| H02J 3/14 | (2006.01) |

(52) U.S. Cl.
CPC ............. G06Q 50/06 (2013.01); G06Q 10/06 (2013.01); H02J 3/32 (2013.01); H02J 3/383 (2013.01); H02J 3/386 (2013.01); H02J 3/16 (2013.01); H02J 2003/146 (2013.01); Y02E 70/30 (2013.01); Y02E 10/563 (2013.01); Y02E 10/566 (2013.01); Y02E 10/763 (2013.01)
USPC .......................................... 700/291; 700/287

(58) Field of Classification Search
USPC ........................................ 700/286, 287, 291
See application file for complete search history.

(56) References Cited

U.S. PATENT DOCUMENTS

| | | | |
|---|---|---|---|
| 6,785,592 B1 * | 8/2004 | Smith et al. .................... | 700/291 |
| 2011/0307109 A1 * | 12/2011 | Sri-Jayantha ................. | 700/291 |

\* cited by examiner

*Primary Examiner* — Carlos Ortiz Rodriguez
(74) *Attorney, Agent, or Firm* — Merchant & Gould P.C.

(57) ABSTRACT

A process for simultaneously providing capacity sale services (e.g. frequency regulation or voltage regulation), energy sale services (energy transfer from off-peak hours to peak hours), and stabilization services of a renewable plant may be provided. The process includes determining the values of energy quantity to be produced by the plant during a near future time interval. The process may also include introducing the values of energy quantity, in the control unit. Generating an hourly program of energy supply to be provided by the energy accumulator unit to the network may also be performed, depending on the values of energy to be produced, which stabilizes the power supplied by the plant to the network. Furthermore, the frequency and the voltage of the network may be regulated as well as transfers the energy between off-peak hours and peak hours, or from hours with saturation of the network to hours without saturation.

9 Claims, 2 Drawing Sheets

PROCEDURE FOR SUPPLY CONTROL AND STORAGE OF POWER PROVIDED BY A RENEWABLE ENERGY GENERATION PLANT

FIELD OF THE INVENTION

The present invention relates to the field of energy generation and distribution. More specifically, the present invention relates to the regulation and optimization of the electrical energy distribution networks in the presence of renewable sources.

BACKGROUND OF THE INVENTION

At present, it is well known that energy accumulator systems and electric batteries can help to improve and optimize the management of electricity networks in various different ways. Mainly, two different divisions of battery systems, are detailed below:

1) Depending on the place where the electricity system is installed, it can be divided as follows:
   1a) Consumption: batteries that are installed together with energy consumers. The batteries can modify the electrical energy consumption profiles displacing them to the hours with greatest available energy or cheaper energy. They can also help to give more uniform consumption profiles over time to simplify the work of the network managers. In this case, the batteries are operated by the energy consumer so that his electricity bill is as small as possible, bearing in mind the cost of the energy at different hours of the day and possible penalties can be imposed on him.
   1b) Distribution: the batteries can be installed in electricity distribution substations and be another element in their management so that they can absorb fluctuations in production or consumption, or they can be used as an energy store in order to have it at peak demand hours. In this case, the batteries are operated by the system managers so that they aid towards the stable operation thereof (for example, helping to control frequency and voltage thereof) as well as reducing costs, avoiding expensive network support generation systems.
   1c) Generation: energy generation plants can also have accumulator batteries to improve their integration in the electricity network, thus meeting network operator demands to improve the economic performance of the plants by being able to transfer off-peak hour generation to peak hours. In this case, the batteries are operated by the electricity plant managers to meet the network operator's legislation and maximize their profits from the sale of electricity.

2) Depending on the battery operation mode, it can be divided as follows:
   2a) Capacity for auxiliary network services: the batteries are controlled depending on the status of the electricity network to help its stability. Generally, these services require a power offer producible during a determined time that will be delivered in response to deviations in network parameters. Therefore, the payment tariffs of these services are usually by available power, sometimes complemented by the value of the energy delivered. A typical example is the control of the frequency in the network that will deviate from the rated frequency if the consumption and the production do not match at a certain time. Therefore, the batteries can offer a power band to deliver or consume from the electricity network so that it reacts, thus helping to equal production and consumption. Another example is voltage regulation in network nodes through the delivery or consumption of reactive power.
   2b) Energy to optimize generation or consumption: for various reasons, energy prices differ at each hour of the day, and there may also be restrictions in the networks due to saturation. Therefore, batteries can be charged during certain times of the day and discharge during other times to optimize either the electricity bill or the generation revenue. This use entails a financial profit proportional to the energy delivered by the batteries. In the renewable plants, a typical use of batteries to optimize generation is the stabilization of the energy delivered by the plant avoiding power delivery fluctuations that are too fast, which may harm the stability of the electricity network whereto they are connected. Furthermore, the dynamics of this type of use are not always the same. A use to stabilize a consumption or a production variable throughout each hour of the day ("firming") will have cycles in the range of minutes-hours. A use to move off-peak generation to peak generation may have one or two daily cycles. A use to avoid overloads in the network can have a few weekly or even monthly cycles.

Furthermore, a battery system connected to an inverter may supply reactive power as a support to the network voltage independently from the charge status of the battery, only guaranteeing that it does not exceed the current limits in the equipment.

More specifically, a battery with storage capacity of 1 MWh can perform 2 daily cycles: one to load 1 MWh in night off-peak value and transfer it in morning peak hours, and another in the afternoon/evening off-peak hours and transfer it in peak night hours. However, a great potential for use of said battery the rest of the day is lost in performing just 1 or 2 cycles, and its management and operation can be clearly optimized.

The technical problem posed here is that energy accumulator systems and devices are currently designed to perform a single functionality (regulation of the power variations of a plant, regulation of network frequency, movement of energy from off-peak hours to peak hours, etc.), in many cases several batteries with different functions being combined at the same point, with the consequent financial cost entailed.

Typically, in a renewable plant, wherein an accumulator unit is necessary to optimize generation (avoid too fast fluctuations in the energy delivered to the network and/or move energy from certain hours of the day to others due to price or saturation), it will be gauged to the worst condition of the production year and is exclusively devoted to this service. However, as the production costs of the renewable plant are dependent on wind or solar resources and, therefore, are very variable, there are a great number of hours in the year where the accumulator system is underused.

A single accumulator unit will be typically formed by a set of individual systems that are connected in series and in parallel to build the system. Therefore, the set of accumulator units that have a single control unit that manages its joint operation is considered a single accumulator system. It is therefore a logical and not physical unit. A plant that contains several accumulator elements but that are managed from a single central control unit central operates in practice as a single accumulator system. The configuration of each of the system's accumulator elements for a specific service (which can be several different ones) is, therefore, considered as state of the art.

SUMMARY OF THE INVENTION

The object of the present invention is a supply and accumulation control process of electrical energy provided by a renewable plant to the network. For this purpose using a single energy storage unit, such as a battery, that makes it possible to simultaneously provide both capacity sale services and energy sale services, varying the accumulation capacity devoted to each one of said services depending on the operating conditions of the renewable plant (depending on the wind or solar resource conditions), thus maximizing the efficiency and output of the electrical installations.

The simultaneous provision of different services and the capacity assigned to each one of them at any given time is based on the use of weather data to: a) predict the battery requirement of each one of said services; b) predict the energy produced throughout the day and with this define the charging and discharging cycles of the battery; and c) establish the services to be offered by the battery.

DESCRIPTION OF THE DRAWINGS

To complement the description being made and in order to aid towards a better understanding of the characteristics of the invention, in accordance with a preferred example of practical embodiment thereof, a set of drawings is attached wherein, with illustrative and non-limiting character, the following has been represented.

DESCRIPTION OF THE INVENTION

Figure 1:
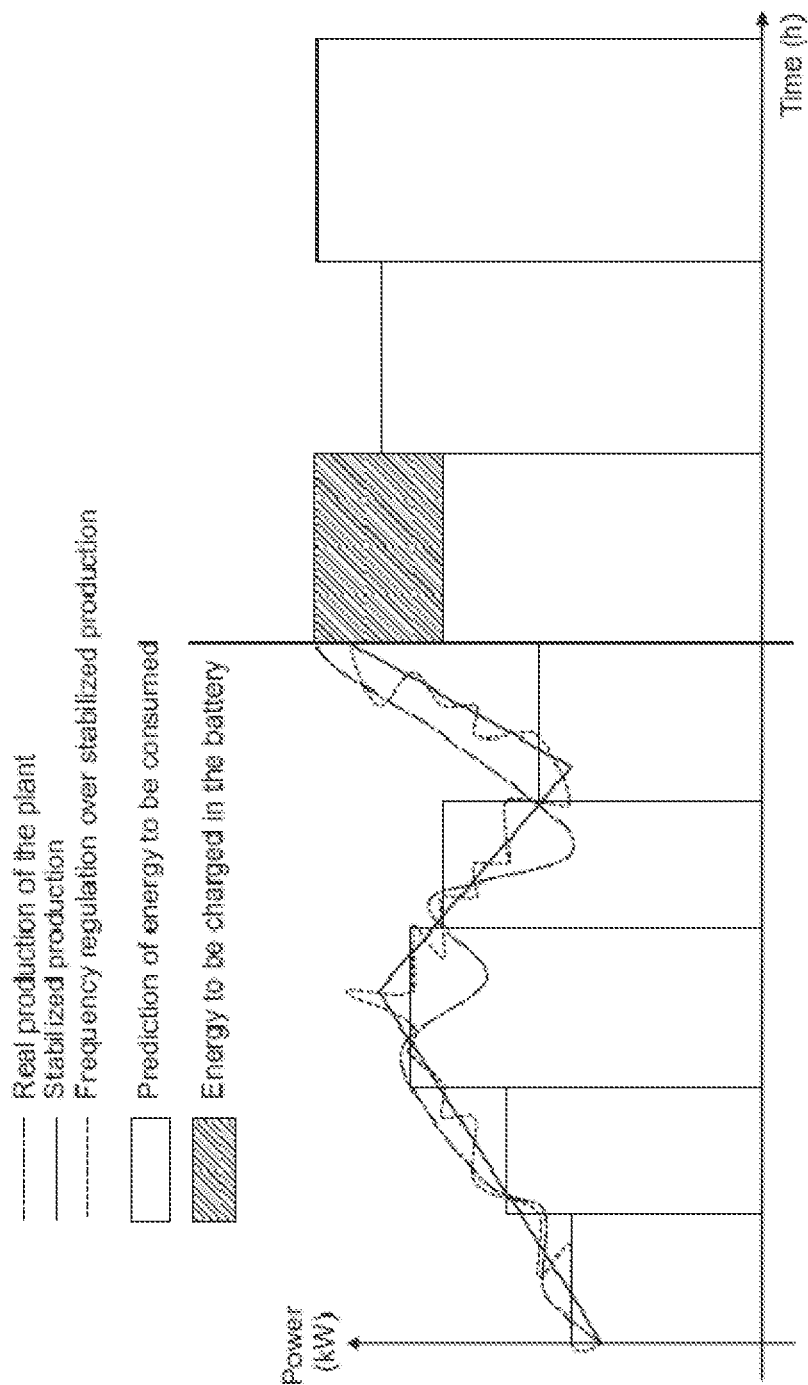
FIG. 1 shows a graphic representing the regulation of a renewable energy plant, for this purpose using an accumulator battery managed according to the process object of the invention.

The present invention resolves the aforementioned drawbacks providing a supply and accumulation control process of electrical energy provided by a renewable energy generation plant, which, by the actuation of a single energy accumulator unit, allows the simultaneous:

provision of capacity sale services (e.g. frequency regulation or voltage regulation);

energy sale services (energy transfer from off-peak hours to peak hours, or from hours with saturation of network to hours without saturation); and stabilization services of the renewable plant, with a dynamic assignment of the capacity of the accumulator unit dedicated to each one of these services depending on the weather forecast, thus maximizing the efficiency and output of the electrical installations.

More specifically, the process object of the invention makes it possible to control the supply and accumulation of the electrical energy provided by a renewable energy generation plant comprising:

renewable energy generation elements;

control and actuation units of the generation elements, which measure the functional parameters of the generation elements and act thereon;

at least one energy accumulator unit; and at least one control unit, connected to the control and actuation units of the generation elements, which regulates the energy accumulator unit charging or delivering power depending on the parameters received from the electricity network, depending on the parameters received from the electricity network and on the functional parameters of the generation elements;

said process fundamentally standing out as it comprises the following phases:

determining the values of energy quantity to be produced by the plant during a near future time interval, depending on weather conditions, introducing these values of energy quantity, in the control unit, generating an hourly programme of energy supply to be provided by the energy accumulator unit to the network, by the control unit, and depending on the values of energy to be produced, which:

stabilizes the power supplied by the plant to the network;

regulates the frequency and the voltage of the network, and transfers the energy between off-peak hours and peak hours, or from hours with saturation of the network to hours without saturation.

Furthermore, the adjustment has been provided of the hourly supply program depending on the evolution of the functional parameters of generation in real time, the market values which are given in real time, and the production prediction during the following hours. In the event of real time necessity, it is possible to adjust the operation of the renewable plant to support the services given by the energy accumulator unit, for example, forcing the plant to produce or consume reactive power to support voltage regulation, or forcing the plant to vary its active power to support frequency regulation if the accumulator unit cannot comply with desired service during a time.

The control process described here additionally comprises introducing in the control unit historic values of energy quantity and power stored or delivered by the energy accumulator unit on previous days with similar weather conditions, in order, with these data, to be able to estimate what is the portion of the energy accumulator unit to be allocated to the stabilization of the power supplied by the plant to the network. Likewise, in accordance with embodiments, the process further comprises introducing variables regarding market costs of energy and variations in market costs of energy between off-peak hours and peak hours, in the control unit.

Likewise, it has been provided that said variables regarding market costs are entered in the control unit periodically, as they vary, to obtain a new hourly energy supply program in real time for the financial optimization of the energy to be supplied.

Figure 2:
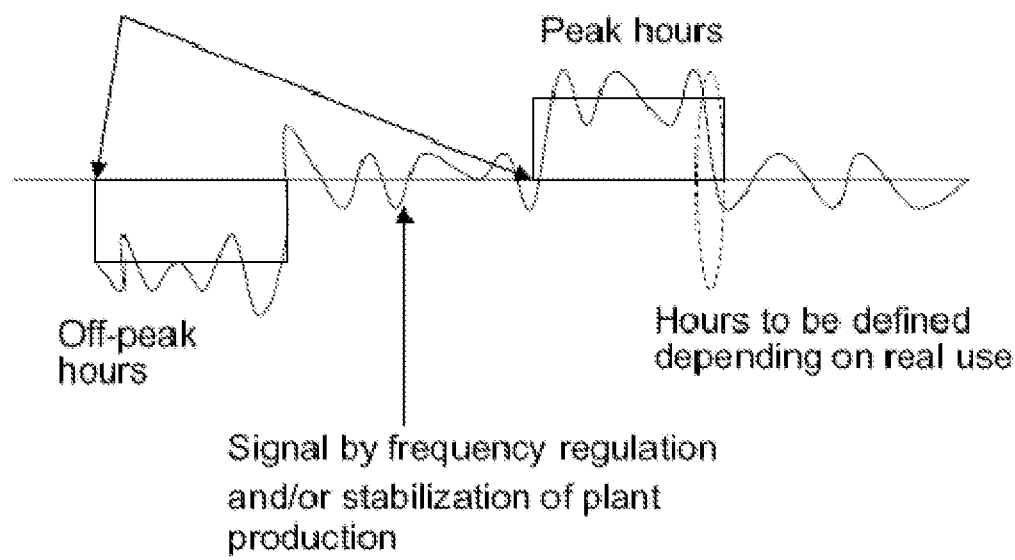
FIG. 2 shows a graphic representing the off-peak hours and the peak hours of energy consumption during a daily cycle.

FIG. 2 shows a graphic representing the off-peak hours and the peak hours of energy consumption during a daily cycle. In this way, it is possible to establish the most suitable moments so that the energy accumulator unit charges during the off-peak hours and discharges during the peak hours. To carry out this optimization, the penalties imposed due to not providing the previously agreed services must be borne in mind. Therefore, it has been provided that the control process object of the invention additionally comprises the introduction of threshold values of contract demand to be produced, in the control unit. It should be indicated that the penalties that each legislation sets due to breach of the services agreed are intrinsic to the renewable production due to its variability with the weather, which cannot be predicted 100%.

Furthermore, the control process additionally comprises the sending of operating instructions from the control unit to the control and actuation units of the generation elements depending on the hourly energy supply program generated.

The phase of determining the values of energy quantity to be produced by the plant is performed depending on the weather conditions, providing an idea of the variation which may arise in the plant on hourly basis. For example, a clear day has little production variability and a very accurate prediction, on a par with a high level of energy production. However, a cloudy day may have important variations in plant production, as well as a worse energy prediction thereof.

More specifically, the phase of determining the values of energy quantity to be produced by the plant is performed from statistical models which, on hourly basis, make it possible to predict the energy to be provided by the accumulator unit to stabilize the power supplied by the plant to the network, regulate the frequency and the voltage of the network, and transfer the energy between off-peak hours and peak hours, or from hours with saturation of the network to hours without saturation. Preferably, the statistical models react in real time throughout the day to modifications in market prices, modifying the service provided by the energy accumulator unit to adapt to new economic optimums. Said modification is performed bearing in mind the penalties imposed due to not providing the agreed services.

Furthermore, throughout the day it will be necessary to recalculate the use of the available energy in the accumulator unit to provide the different functions, since the reality will almost certainly not be the same as the predictions. The adjustment is calculated based on the production obtained in the plant during the most recent hours, and the production forecast in the coming hours, since the financial calculation of the penalties will not only made based on the function to be performed with the energy available in the accumulator unit, but also on the sale of energy from the plant.

In this way and by way of example, if the energy devoted to the frequency regulation function in the network is greater than that forecast, it can be decided at a determined time to reduce the sale of energy from the plant to the network to further charge the accumulator unit or battery, and thus, be able to continue providing frequency regulation services, for example, either because the production exceeds the energy consumption and generation program or because at that time the market tariffs outweigh the execution of said functionality.

Recall the special characteristic that during the provision of the frequency regulation service only a small percentage of the available power offered by the storage unit is consumed, for which reason it is possible to estimate a use of said unit, less than that offered, if the price prediction models of the aforementioned market are available.

Finally, it has been provided that the hourly energy supply program further comprises the generation of an hourly program of reactive energy supply to the network, depending on the generation capacity available in the generation elements and the accumulator unit. In this way, the energy accumulator unit can provide voltage regulation services in the network, through the delivery or consumption of reactive power irrespective of the charge status (hereinafter SOC) of said accumulator unit.

Therefore, an energy accumulator unit or battery managed according to the process of the present invention can at all times transfer available energy from one function to another. It is therefore feasible to design a greater number of functionalities for a given capacity of said accumulator unit, making it possible to manage the non-performances that arise in the provision of the functions in optimal fashion. This achieves a renewable plant that is always energy producing, able to give network services, and a service to the plant to improve the quality of the energy delivered to the general electricity network.

In accordance with embodiments, the regulation process of the charging status of a battery, which stores energy produced by a solar photovoltaic plant depending on three sets of parameters, is described below:

production prediction of the renewable plant, with its different percentiles;

a statistical model for prediction of the battery capacity necessary to perform the stabilization function of the delivery of power to the network by the solar photovoltaic plant depending on the production prediction thereof (or on the prediction of available solar resources); and benchmark market prices of the different services the battery may provide.

The process consists of the following stages:

determining the energy necessary to cover energy offer functions in dynamics of seconds (frequency regulation) for each hour of the production day of the solar plant, resorting for this to statistical models based on previous days with similar network conditions, said statistical models being updated on hourly basis;

determining the necessary energy to cover energy offer functions in intra-hour dynamics (stabilization service of the energy delivered to the network to avoid rapid fluctuations);

determining the necessary energy to cover energy offer functions in daily dynamics, (energy transfer from off-peak hours to peak hours, or recovery of Network limitations). For this, it resorts to the data supplied by the network operator and price models and limitations of similar days and similar network parameters;

determining the energy quantity of the battery which is going to be used to cover each of the aforementioned functions, and the charging times of the battery with energy produced by the plant;

calculating economic balances to adjust the energy used to cover each function for an optimum technical or economic value function; and operating the battery in accordance with the distribution of functions determined for each hour, monitoring in real time compliance with the above calculated cases and adjusting them in accordance with the evolution of the real market and production of the plant knowing the energy available prediction for the following hours.

The energy necessary to cover the energy off is determined based on the weather prediction of each operating hour of the day of the solar plant, bearing the following parameters in mind: radiation level with its percentiles of probability of occurrence, temperature, wind speed and cloud level. This prediction is combined with statistical models that reflect the past operation of the solar plant or solar plants with similar dimensions and conditions.

FIG. 1 represents the regulation of a solar photovoltaic plant making use of the regulation process described herein.

More specifically, FIG. 1 shows the frequency regulation on the stabilized production curve of the plant. Furthermore, said graphic shows a quadrangular striped section, which represents the difference in energy between the forecast energy consumption and the energy produced by the plant. The energy being stored in the battery for its later use during the peak hours of the energy demand.

Finally, instead of a battery any energy storage device can be used, such as, for example, compressed air energy storage (CAES), which is based on the storage of wind power in the subsoil for its later use.

The invention claimed is:

1. A system for supplying and accumulating electrical energy comprising:
   at least one renewable energy generation element;
   a control unit and an actuation unit for the at least one renewable energy generation element, the control unit operative to measure functional parameters of the at least one renewable energy generation element;
   at least one energy accumulator unit connected to the control unit and the actuation unit, the at least one energy accumulator unit configured to regulate an accumulation unit charging or delivering power;
   wherein the control unit and the actuation unit are configured to:
      determine values of energy quantity to be produced by the at least one renewable energy generation element during a future time interval depending on weather conditions;
      store the values of energy quantity;
      generate an hourly program of energy supply to be provided by the energy accumulator unit to a network dependent on the values of energy quantity to be produced which:
         stabilizes a power supplied by a plant to a network;
         provides frequency regulation service to the network;
         provides voltage regulation service to the network; and
         transfers the energy between off-peak hours and peak hours or from hours with saturation of the network to hours without saturation; and
      vary an accumulation capacity devoted to capacity sale services, energy sale services and stabilization services concurrently depending on operating conditions of the at least one renewable energy generation elements.

2. The system of claim 1, wherein the at least one energy accumulator unit is configured to transmit, to the control unit, historic values of energy quantity and power stored by the at least one energy accumulator unit on previous days with similar weather conditions.

3. The system of claim 1, wherein the at least one energy accumulator unit is configured to transmit, to the control unit, historic values of energy quantity and power delivered by the at least one energy accumulator unit on previous days with similar weather conditions.

4. The system of claim 1, wherein the at least one energy accumulator unit is configured to transmit variables regarding market costs of energy and variations in market costs of energy between off-peak hours and peak hours to the control unit comprising the at least one energy accumulator unit configured to transmit the variables regarding market costs of energy and variations in market costs of energy between off-peak hours and peak hour periodically as the market costs change.

5. The system of claim 1, wherein the at least one energy accumulator unit is configured to transmit threshold values of contract demand to be produced to the control unit.

6. The system of claim 1, wherein the control unit is configured to generate an hourly program of supply of reactive power to a network depending on a generation capacity available in the at least one renewable energy generation element and the at least one energy accumulator unit.

7. A method for accumulating and supplying electrical energy, the method comprising:
   determining, depending on weather conditions, quantities of energy to be produced by a renewable plant during a future time interval;
   receiving, at a control unit, the quantities of energy to be produced by the renewable plant during the future time interval;
   receiving at the control unit historic values of energy quantity and power stored and delivered by an energy accumulator unit on previous days with similar weather conditions;
   receiving, at the control unit, variables regarding market costs of energy and variations in market costs of energy between off-peak hours and peak hours;
   receiving, at the control unit, threshold values of contract demand energy to be produced;
   generating, by the control unit, an hourly program of an energy supply to be provided by the energy accumulator unit to a network dependent on the threshold values of contract demand energy to be produced which:
      stabilizes power supplied by the renewable plant to the network;
      provides frequency regulation services to the network;
      provides voltage regulation services to the network; and
      transfers energy between off-peak hours and peak hours, or from hours with saturation of the network to hours without saturation; and
   varying an accumulation capacity devoted to capacity sale services, energy sale services and stabilization services concurrently depending on the operating conditions of the renewable plant.

8. The method of claim 7, further comprising transmitting operating instructions from the control unit to an actuation unit, the operating instructions being dependent on the hourly program generated.

9. The method of claim 7, further comprising transmitting a new hourly energy supply program in substantially real time to generate an optimized amount of energy to be supplied.

* * * * *